(12) United States Patent
Stauss et al.

(10) Patent No.: US 12,493,131 B2
(45) Date of Patent: Dec. 9, 2025

(54) SYSTEM AND METHOD FOR DETECTING OBJECTS BEHIND AN OPAQUE SURFACE

(71) Applicant: Zircon Corporation, Campbell, CA (US)

(72) Inventors: John Robert Stauss, Los Gatos, CA (US); Pablo Montero, San Jose, CA (US); Micaela Abarca Kapp, San Jose, CA (US)

(73) Assignee: Zircon Corporation, Campbell, CA (US)

( * ) Notice: Subject to any disclaimer, the term of this patent is extended or adjusted under 35 U.S.C. 154(b) by 0 days.

(21) Appl. No.: 19/095,182

(22) Filed: Mar. 31, 2025

(65) Prior Publication Data

US 2025/0306229 A1  Oct. 2, 2025

Related U.S. Application Data

(60) Provisional application No. 63/573,418, filed on Apr. 2, 2024.

(51) Int. Cl.
*G01D 5/24* (2006.01)
*G01V 3/08* (2006.01)
(Continued)

(52) U.S. Cl.
CPC .......... *G01V 3/088* (2013.01); *G01D 5/2405* (2013.01); *G01V 3/165* (2013.01); *G01V 3/38* (2013.01); *G01D 2218/00* (2021.05)

(58) Field of Classification Search
CPC .......... G01V 3/088; G01V 3/165; G01V 3/38; G01D 5/2405; G01D 2218/00
See application file for complete search history.

(56) References Cited

U.S. PATENT DOCUMENTS

2005/0194959 A1\* 9/2005 Miller .................... G01V 3/088
324/67
2005/0242800 A1\* 11/2005 Heger .................... G01V 13/00
324/67

(Continued)

OTHER PUBLICATIONS

International Search Report and Written Opinion dated Jun. 18, 2025 from PCT Application No. PCT/US2025/022460, filed Apr. 1, 2025.

*Primary Examiner* — Eman A Alkafawi
*Assistant Examiner* — Suresh K Rajaputra
(74) *Attorney, Agent, or Firm* — Silicon Valley Patent Group LLP; Thomas C. Chan

(57) ABSTRACT

Aspects of the present invention include a system and method for detecting one or more objects detected behind an opaque surface, comprising collecting, by a plurality of sensors of a scanner, sensor data of the one or more objects behind an opaque surface; identifying, by one or more processors of the scanner, characteristics of signal strengths detected by a pair of capacitive sensors using the sensor data, including concurrent behaviors of a first capacitive sensor and a second capacitive sensor in the pair of capacitive sensors; analyzing, by the one or more processors, the characteristics of signal strengths detected to determine different regions of the one or more objects behind the opaque surface; and informing a user, by the one or more processors via a user interface of the scanner, of the different regions of the one or more objects behind the opaque surface.

20 Claims, 18 Drawing Sheets

(51) Int. Cl.
    *G01V 3/165*     (2006.01)
    *G01V 3/38*      (2006.01)

(56)            References Cited

U.S. PATENT DOCUMENTS

2005/0253597 A1* 11/2005 Miller .................... G01V 3/088
                                                          324/662
2011/0215818 A1   9/2011 Dorrough
2011/0243476 A1* 10/2011 Sieracki ................. G01V 3/15
                                                          382/291
2021/0096273 A1*  4/2021 Chen ....................... G01V 3/088
2021/0156715 A1*  5/2021 Stauss ..................... G01D 5/06
2022/0011460 A1*  1/2022 Stauss ..................... G01V 3/38
2023/0049709 A1*  2/2023 Stauss ..................... G01V 3/165
2023/0288233 A1   9/2023 Boehm et al.

* cited by examiner

624 — In response to the signal strength of the first capacitive sensor increases and the signal strength of the second capacitive sensor increases, identify a leading edge of an object based on an absolute difference between the signal strength of the first capacitive sensor and the signal strength of the second capacitive sensor reaches a first maximum 626 — In response to the signal strength of the first capacitive sensor decreases and the signal strength of the second capacitive sensor decreases, identify a trailing edge of an object based on based on an absolute difference between the signal strength of the first capacitive sensor and the signal strength of the second capacitive sensor reaches a second maximum 628 — In response to a leading edge being detected, identify a center of an object based on a difference between the signal strength of the first capacitive sensor and the signal strength of the second capacitive sensor reaches a minimum

FIG. 6C

SYSTEM AND METHOD FOR DETECTING OBJECTS BEHIND AN OPAQUE SURFACE

CROSS REFERENCE TO RELATED APPLICATIONS

This application claims the benefit of U.S. provisional application No. 63/573,418, "System and Method for Detecting Objects behind an Opaque Surface," filed Apr. 2, 2024, assigned to the assignee hereof. The aforementioned United States application is hereby incorporated by reference in its entirety.

FIELD

The present invention relates to the field of scanners for detecting one or more objects behind an opaque surface.

BACKGROUND

As an example, stud finders have been commonly used in construction and home improvement industries. FIG. 1 illustrates a side view of a conventional scanner. As shown in FIG. 1, a scanner 102 may be used in a construction and home improvement environment 100. For example, scanner 102 may be configured to detect an object 101 behind an opaque surface 103. In some exemplary applications, object 101 may be a stud, an electrical wire, or a metal pipe. In one exemplary embodiment, the stud may be a wooden stud, vertical wooden element, bridging block, fire block, or any other block, joists, rafters, headers, posts, columns, let brace, or any similar wooden element used for integrity, fabrication, or maintenance of a structural element. In one exemplary embodiment, opaque surface 103 may be, for example, a wall covered with drywall, particle board, or plywood; as an example, a floor with opaque material attached to structural members; as an example, a ceiling with an opaque surface, attached to rafters; or any other opaque surface behind which objects are not visible through the surface.

In one exemplary embodiment, scanner 102 may include a housing to enclose and protect various electronic components. For example, within the housing of the scanner 102, it may include a printed circuit board (PCB) 104, which can be configured to hold the various electronic components, such as one or more capacitive sensors 108, one or more metal sensors 109, one or more current sensors (not shown), a controller/processor and other integrated circuits (labelled as 106a and 106b). The PCB 104 may be coupled to a battery 107, which provides power to the scanner 102. In conventional applications, the one or more capacitive sensors 108, one or more metal sensors 109, and one or more current sensors are typically operated individually or separately. In addition, conventional stud finders may falsely report electrical wires, plastic water pipes or metal water pipes as studs. Besides the risk of damaging the electrical wires and water pipes, such false reports may lead to hazards that can injure the user.

Therefore, there is a need for a scanner that can address the above drawbacks of the conventional scanner in detecting one or more objects detected behind an opaque surface.

SUMMARY

Aspects of the present invention include a method for detecting one or more objects detected behind an opaque surface, including collecting, by a plurality of sensors of a scanner, sensor data of the one or more objects behind an opaque surface along a scan path of the scanner; identifying, by one or more processors of the scanner, characteristics of signal strengths detected by a pair of capacitive sensors using the sensor data, including concurrent behaviors of a first capacitive sensor and a second capacitive sensor in the pair of capacitive sensors; analyzing, by the one or more processors, the characteristics of signal strengths detected by the pair of capacitive sensors to determine different regions of the one or more objects behind the opaque surface; and informing a user, by the one or more processors via a user interface of the scanner, of the different regions of the one or more objects behind the opaque surface.

A scanner for detecting one or more objects detected behind an opaque surface includes a plurality of sensors of the scanner configured to collect sensor data of the one or more objects behind the opaque surface along a scan path of the scanner; one or more processors of the scanner configured to identify characteristics of signal strengths detected by a pair of capacitive sensors using the sensor data, where characteristics of signal strengths include concurrent behaviors of sensor data collected by a first capacitive sensor and a second capacitive sensor in the pair of capacitive sensors; the one or more processors are further configured to analyze the characteristics of signal strengths detected by the pair of capacitive sensors to determine different regions of the one or more objects behind the opaque surface; and the one or more processors via a user interface of the scanner are further configured to inform a user of the different regions of the one or more objects behind the opaque surface.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the non-limiting and non-exhaustive aspects of the following drawings. Like numbers are used throughout the disclosure.

FIG. 6C illustrates an exemplary method of identifying regions of an object according to aspects of the present invention.

DESCRIPTION OF EMBODIMENTS

Methods and apparatuses are provided for detecting objects behind an opaque surface. The following descriptions are presented to enable a person skilled in the art to make and use the invention. Descriptions of specific embodiments and applications are provided only as examples. Various modifications and combinations of the examples described herein may be readily apparent to those skilled in the art, and the general principles defined herein may be applied to other examples and applications without departing from the scope of the invention. Thus, the present invention is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

Some portions of the detailed description that follow are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

The drawings are presented for illustration purposes, and they are not drawn to scale. In some examples, rectangles, circles or other shapes are used to illustrate shapes of objects and their respective estimated shapes of the objects. In real world applications, the shapes of objects and their respective estimated shapes of the objects may be irregular and may be in any shapes or forms. Note that in the following figures, for each object, a section of the object, not the entire object, is shown. This also applies to the respective estimated shape of each object.

Figure 1:
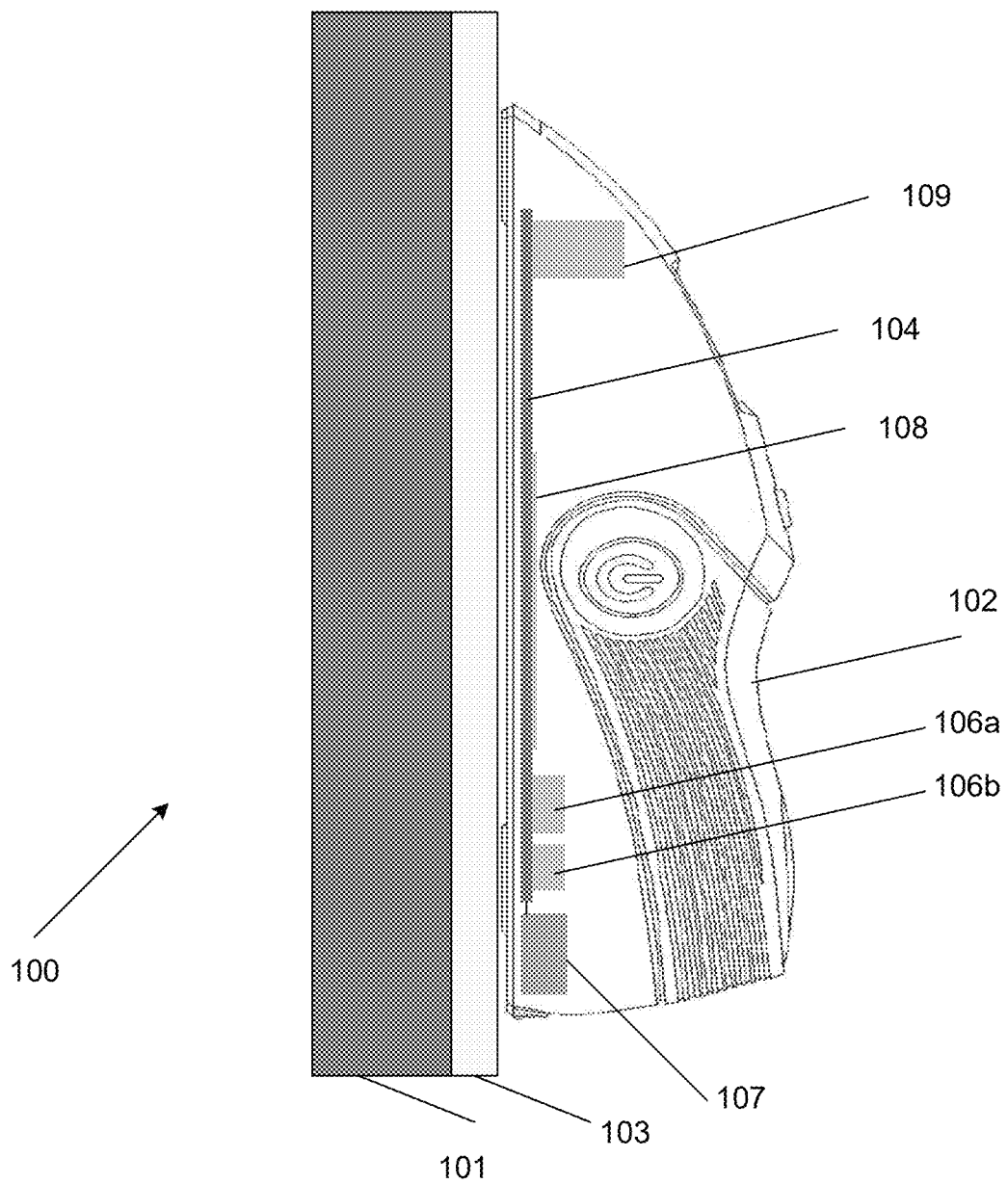
FIG. 1 illustrates a side view of a conventional scanner.
Figure 2:
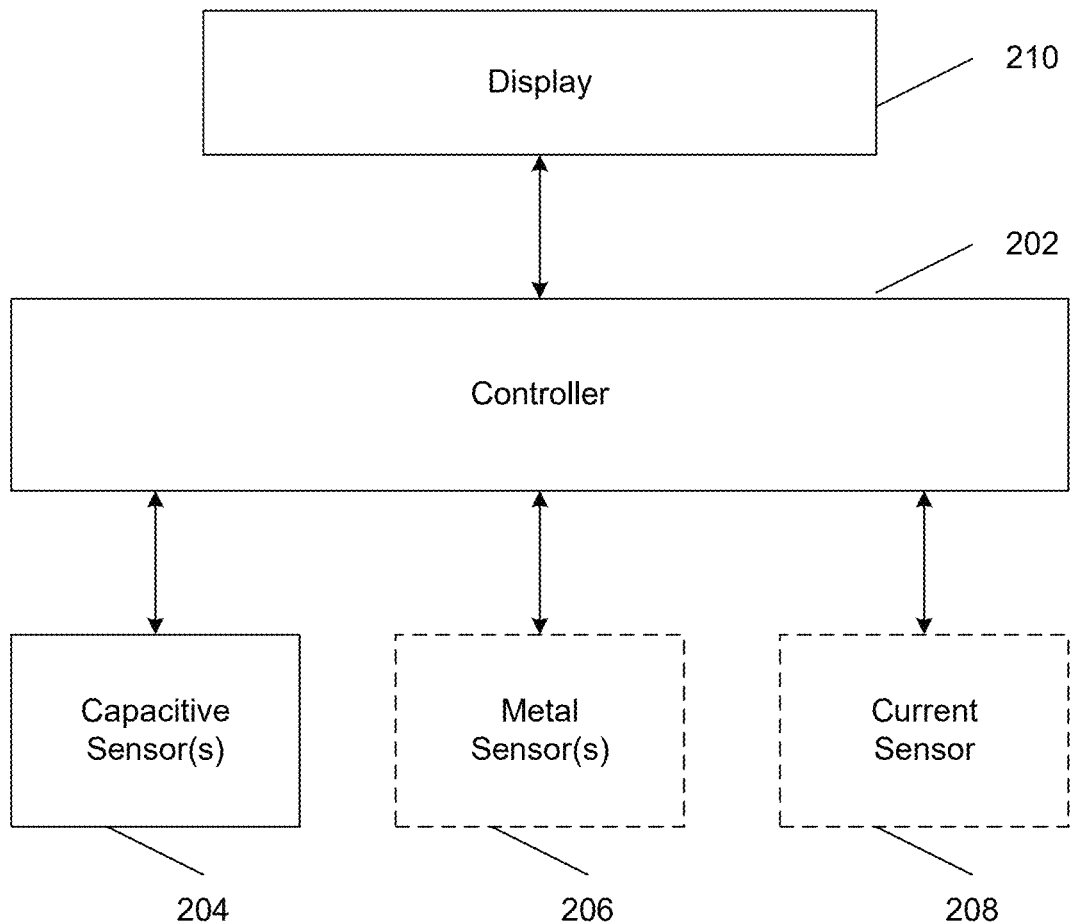
FIG. 2 illustrates a block diagram of an exemplary embodiment of a system for detecting objects behind an opaque surface according to aspects of the present invention.

FIG. 2 illustrates a block diagram of an exemplary embodiment of a system for detecting objects behind an opaque surface according to aspects of the present invention. In the exemplary system shown in FIG. 2, controller 202 may be configured to process sensor data collected by sensors of the scanner, namely sensor data collected by capacitive sensors 204, metal sensors 206, and current sensors 208, or other types of sensors. In some implementations, the metal sensors 206 and/or the current sensors 208 may be optional in the system. In some other implementations, the system may optionally or additionally include a humidity sensor configured to measures water content in the surrounding air, a temperature sensor configured to measure temperature of surrounding air or surface, and a moisture sensor configured to measure water content in a substance. The controller can further be configured to determine information about the detected objects behind the opaque surface based on the sensor data collected by capacitive sensors 204, metal sensors 206, and/or current sensors 208 in parallel. The controller may include one or more processors. A display 210 is configured to provide information about the detected objects to a user. In some other implementations, each type of sensor, such as the capacitive sensor 204, the metal sensor 206, and the current sensor 208, can be turned on individually or in certain desired combinations while the other types of sensors are turned off so that certain types of objects behind the opaque surface may be highlighted by such scans. The one or more processors can process the sensor data to differentiate the different objects detected and select a certain object and disclose to the user its corresponding region based on the differences in density of the different objects detected.

Figure 3A:
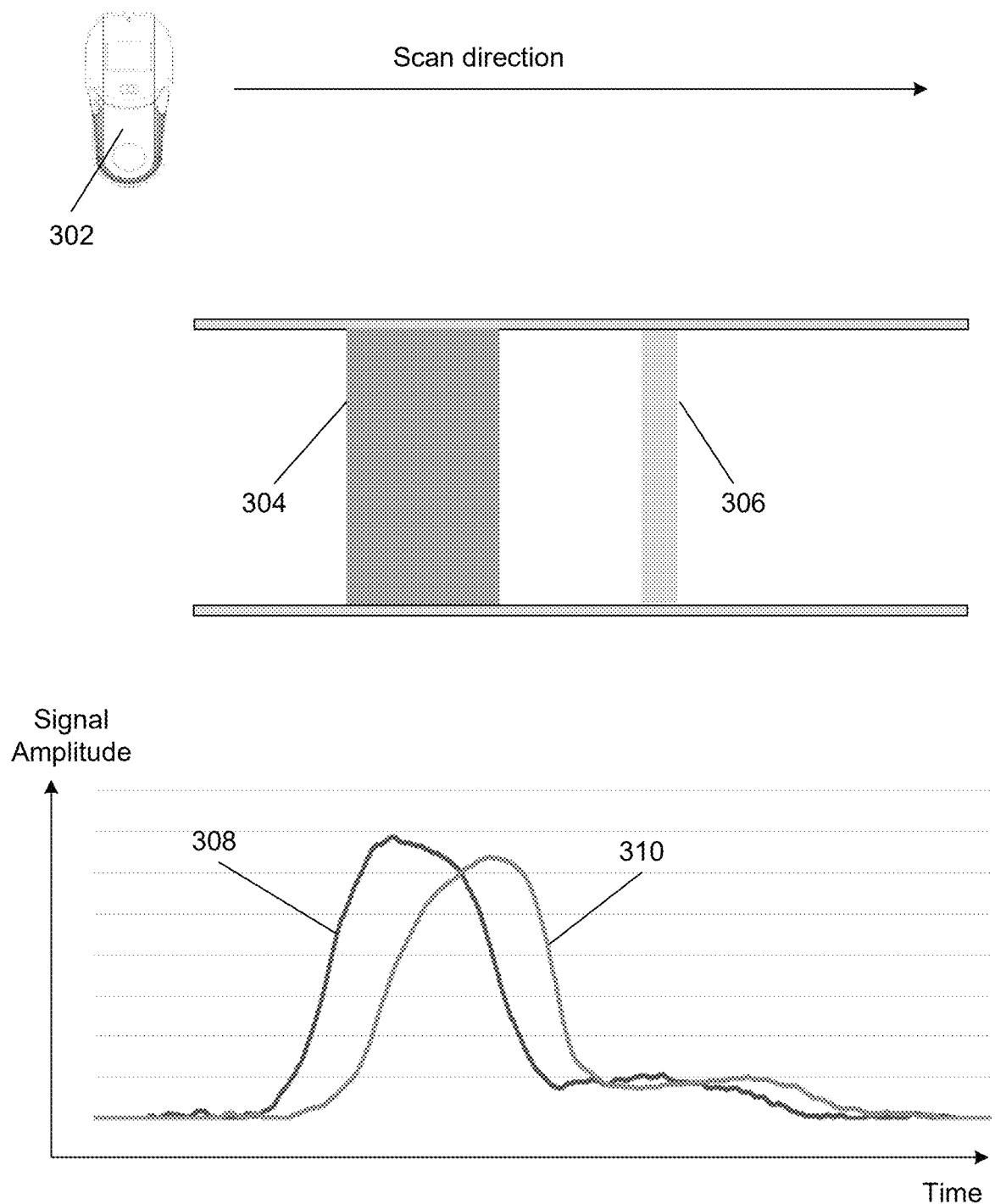
FIG. 3A illustrates an exemplary embodiment of detecting wood stud and PEX pipe behind an opaque surface according to aspects of the present invention.
Figure 4A:
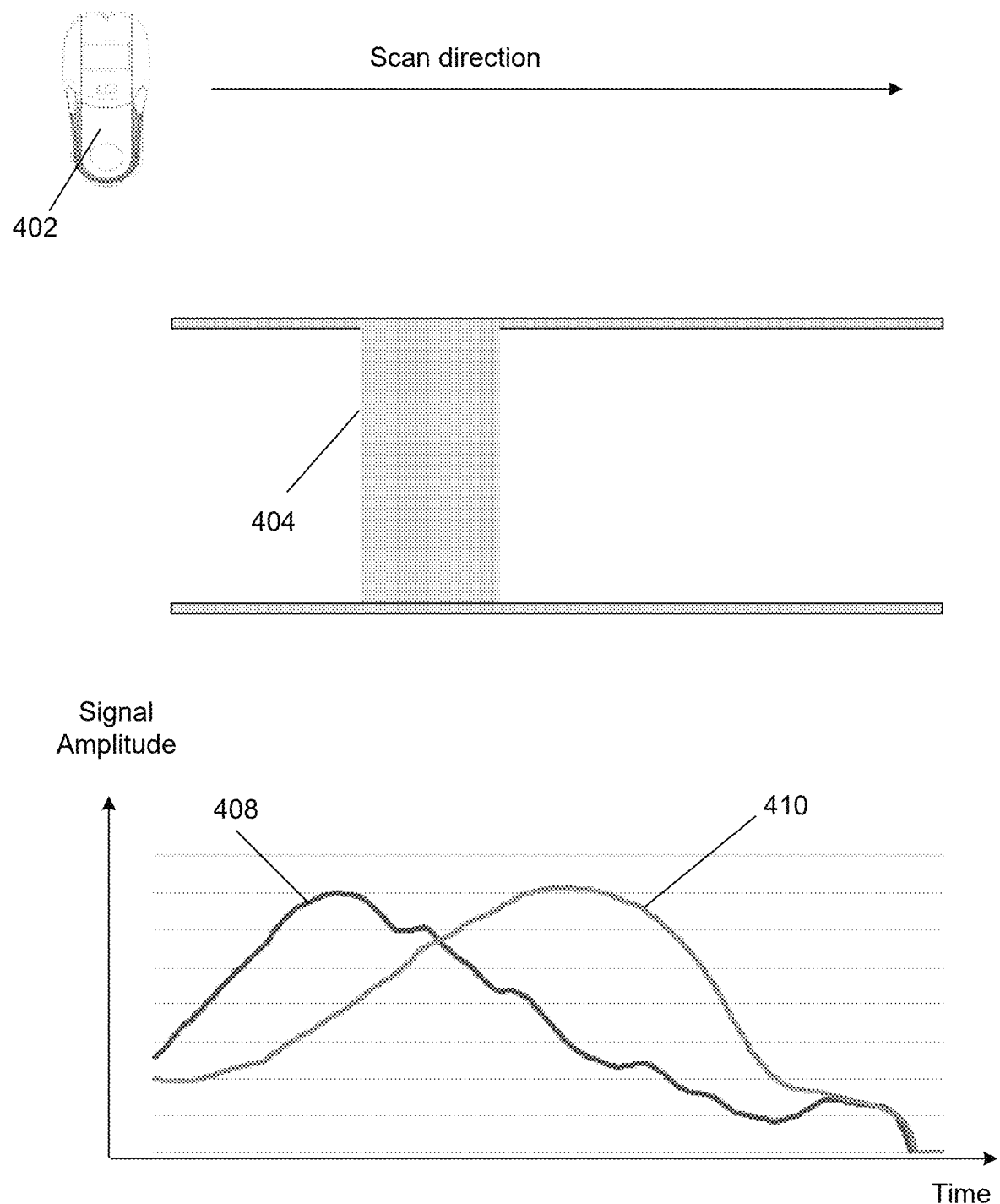
FIG. 4A illustrates an exemplary embodiment of detecting an ABS pipe behind an opaque surface according to aspects of the present invention.

According to aspects of the disclosure, the functional blocks described in the system of FIG. 2 may be implemented in an integrated device such as scanner 302 of FIG. 3A and scanner 403 of FIG. 4A. In other implementations, the capacitive sensors 204, metal sensors 206, and current sensor 208 may reside in one device, while the controller 202 and the display 210 may reside in another device. For example, a scanner device may include the sensors, and the sensor data collected by the scanner device may be wirelessly communicated to a second device. The second device, for example a smartphone, a tablet, or a laptop, may include the controller 202 and the display 210. In yet other implementations, the controller 202, the capacitive sensors 204, metal sensors 206, and current sensor 208, may reside in one device, while the display 210 may reside in another device. For example, a scanner device may include the controller 202 and the sensors, and the sensor data collected by the scanner device may be wirelessly communicated to a second device. The second device, for example a monitor, may be configured to receive and display the sensor data.

According to aspects of the present disclosure, examples of capacitive sensors and methods of operating the same are described in U.S. Pat. No. 5,619,128, entitled "STUD SENSOR WITH OVER-STUD MISCALIBRATION VIA CIRCUIT WHICH STORES AN INITIAL CALIBRATION DENSITY, COMPARES THAT TO A CURRENT TEST DENSITY AND OUTPUTS RESULT VIA INDICATOR," which is incorporated herein in its entirety by reference. Examples of metal sensors and methods of operating the same are described in U.S. Pat. No. 7,812,722, entitled "DUAL ORIENTATION METAL SCANNER," which is incorporated herein in its entirety by reference. Examples of current sensors and methods of operating the same are described in U.S. Pat. No. 6,933,712, entitled "ELECTRICAL CIRCUIT TRACING AND IDENTIFYING APPARA- TUS AND METHOD," which is incorporated herein in its entirety by reference. In one exemplary embodiment, current sensors may be able to detect electromagnetic fields generated by an alternating current. In another exemplary embodiment, current sensors may be able to detect the electromagnetic fields generated by a direct current.

FIG. 3A illustrates an exemplary embodiment of detecting wood stud and PEX pipe behind an opaque surface according to aspects of the present invention. In the example of FIG. 3A, scanner 302 scans in a direction from left to right. The horizontal axis represents time, and the vertical axis represents signal amplitude. A wood stud 304 and a PEX pipe 306 are exemplary objects behind an opaque surface (made visible for illustration purposes). Curve 308 represents an amplitude of signal strength detected by a leading capacitive sensor plate and curve 310 represents an amplitude of signal strength detected by a trailing capacitive sensor plate of the scanner 302. The sensor data collected by the capacitive sensors are processed and analyzed by a controller, such as controller 202 of FIG. 2. The analysis of sensor data collected is described in association with FIG. 3A-3E. Information derived from the analysis about objects behind the opaque surface can be communicated to a user through a display, such as display 210 of FIG. 2.

Figure 3B:
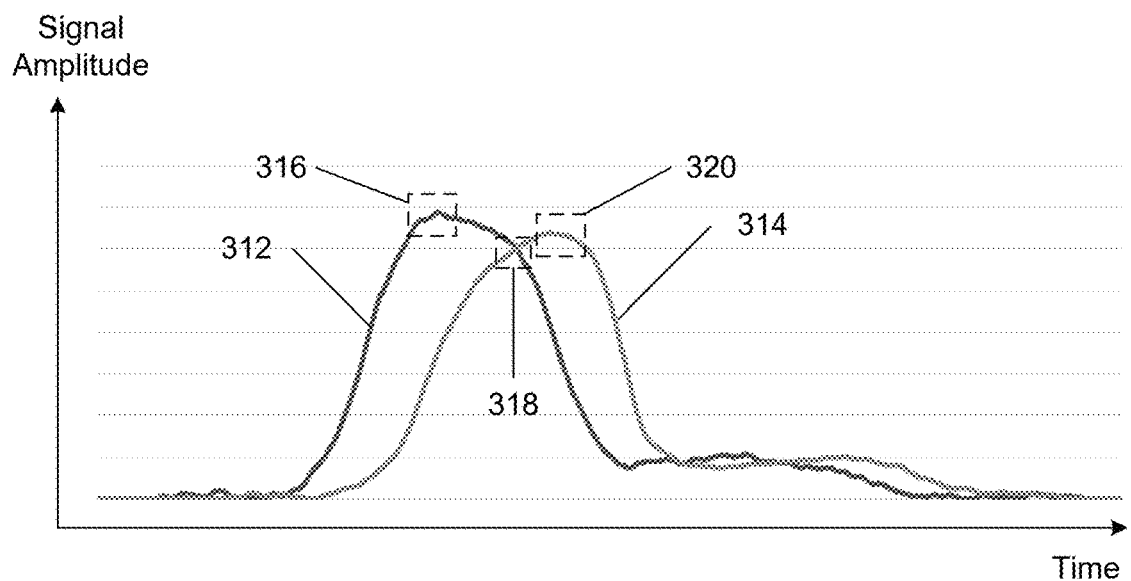
FIG. 3B illustrates an exemplary method of detecting information about objects behind an opaque surface according to aspects of the present invention.
Figure 3B:
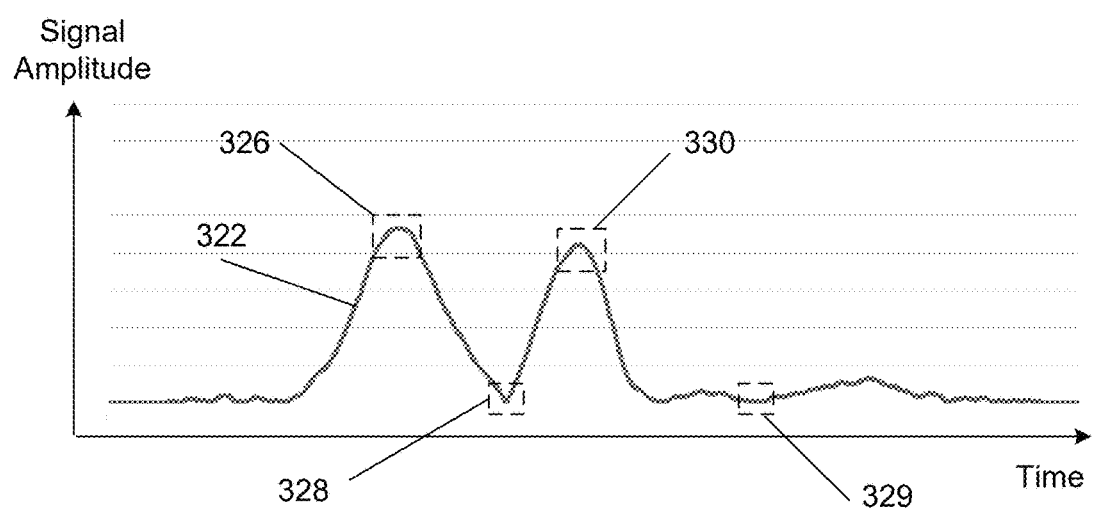
Figure 3B:
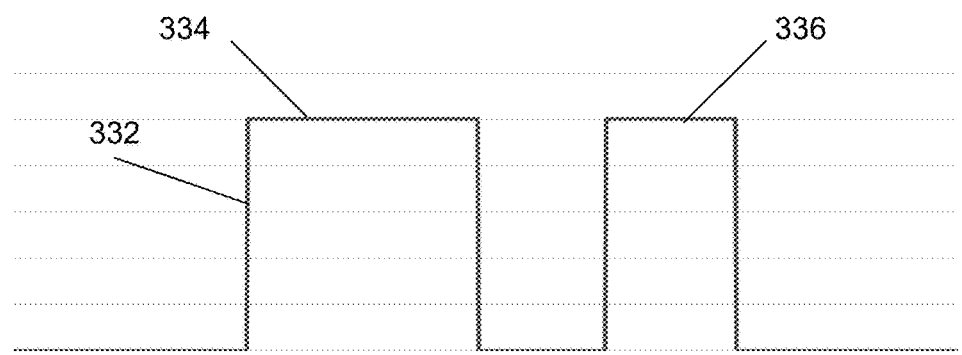

FIG. 3B illustrates an exemplary method of detecting information about objects behind an opaque surface according to aspects of the present invention. In the exemplary method of FIG. 3B, in analyzing sensor data collected, a controller examines whether the signal strength amplitudes of capacitive sensors are above a minimum signal strength threshold. For example, the controller examines whether the signal strength amplitudes are larger than a predetermined minimum threshold in weak signal situations. The predetermined minimum threshold may be determined using empirical data through experimentation. In addition, the controller may examine whether the signal strength amplitudes of both the leading and trailing capacitive sensor plates are increasing. This condition may be used to indicate the scanner may be approaching an object. Moreover, the controller may examine whether the absolute difference between the pair of capacitive sensors is increasing. This condition may also be used to indicate the scanner may be approaching an object. In addition, taking the absolute difference between the pair of capacitive sensors may be used to eliminate noise level amplitudes that may cause false identification.

In one embodiment of FIG. 3B, the horizontal axis represents time, and the vertical axis represents signal amplitude. Curve 312 indicates the signal strength amplitude of the leading capacitive sensor plate. Curve 314 indicates the signal strength amplitude of the trailing capacitive sensor plate. A local maximum region 316 of the leading capacitive sensor plate may be used to indicate a leading edge of an object; similarly, a local maximum region 320 of the trailing capacitive sensor plate may be used to indicate a trailing edge of an object behind the opaque surface. Region 318 where curve 312 and curve 314 cross each other may be used to indicate a center of the object behind the opaque surface.

Curve 322 indicates the absolute value of the signal strength difference between the leading capacitive sensor plate and the trailing capacitive sensor plate. A first local maximum region 326 may be used to indicate a leading edge of an object; similarly, a second local maximum region 330 may be used to indicate a trailing edge of an object behind the opaque surface. Region 328 where the absolute value of the signal strength difference between the leading capacitive sensor plate and the trailing capacitive sensor plate being minimum, coupled with the condition that the scanner is over an object, may be used to indicate a center of the object behind the opaque surface. Similarly, another region 329 where the absolute value of the signal strength difference between the leading capacitive sensor plate and the trailing capacitive sensor plate being minimum, coupled with the condition that the scanner is over an object, may be used to indicate a center of another object behind the opaque surface.

Curve 332 indicates the conditions for the enable over object detection condition have been met. In particular, the line segment 334 may be used to indicate the scanner is over an object; and line segment 336 may be used to indicate the scanner is over another object.

In one embodiment, the condition of the scanner being over an object is met when a peak of the difference is detected for a leading capacitive plate. This condition may also be used to indicate the leading edge has been detected. On the other hand, the condition of the scanner being over an object is not met when the edge detection of the trailing capacitive plate has moved away from the detected object.

Figure 3C:
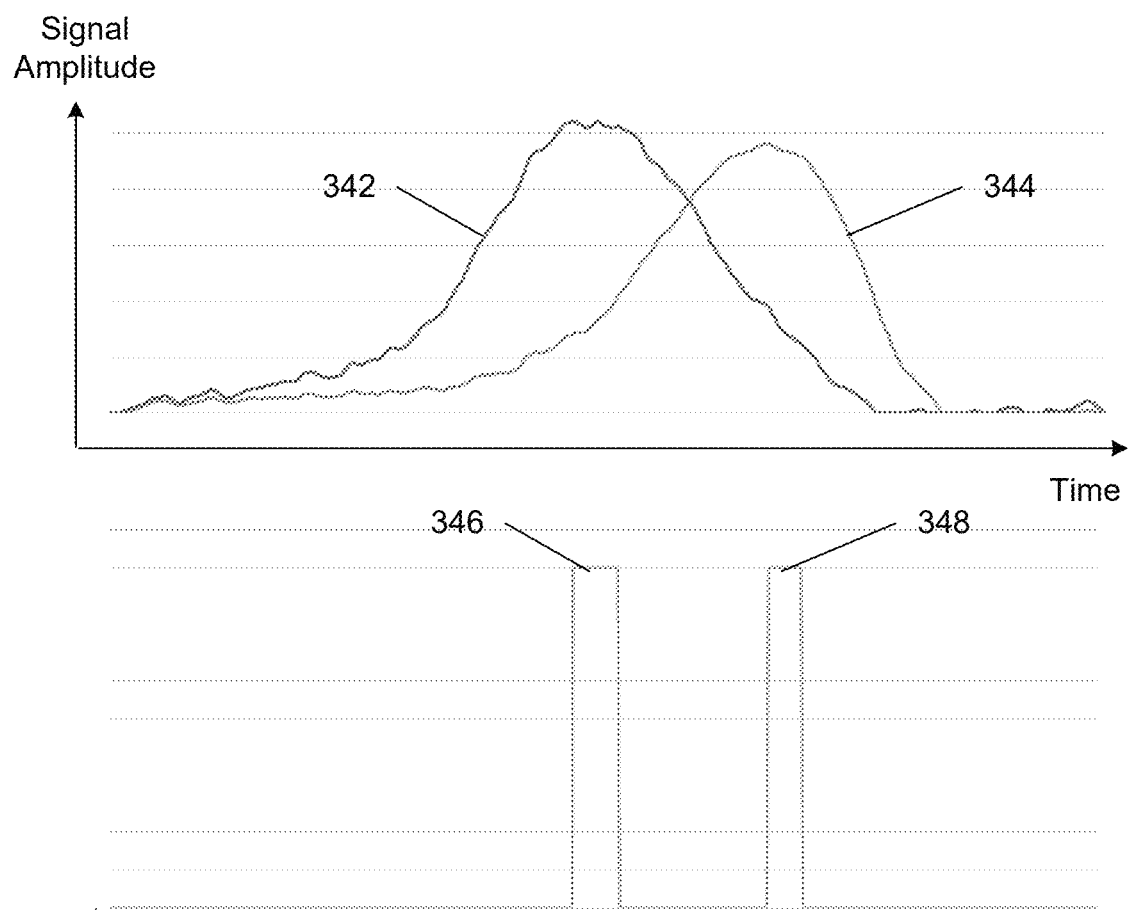
FIG. 3C illustrates an exemplary method of detecting information about edges of an object behind an opaque surface according to aspects of the present invention.

FIG. 3C illustrates an exemplary method of detecting information about edges of an object behind an opaque surface according to aspects of the present invention. In the exemplary embodiment of FIG. 3C, the scan direction is from left to right. The horizontal axis represents time, and the vertical axis represents signal amplitude. Curve 342 indicates the signal strength amplitude of the leading capacitive sensor plate. Curve 344 indicates the signal strength amplitude of the trailing capacitive sensor plate.

In some implementations, an edge is detected when the condition of the scanner being over an object is met and current signal strength amplitude is within a range of a maximum threshold for edge and a minimum threshold for edge, where the maximum threshold for edge and the minimum threshold for edge may be determined from empirical data through experimentation.

A leading edge 346 of an object may be detected using the absolute difference in signal strength amplitude between a first capacitive sensor and a second capacitive sensor of the scanner. In one implementation, in responses to the signal strength of the first capacitive sensor increases and the signal strength of the second capacitive sensor increases, a leading edge of an object may be identified when an absolute difference between the signal strength of the first capacitive sensor and the signal strength of the second capacitive sensor reaches a first maximum.

A trailing edge 348 of an object may be detected using the absolute difference in signal strength amplitude between a first capacitive sensor and a second capacitive sensor of the scanner. In one implementation, in response to the signal strength of the first capacitive sensor decreases and the signal strength of the second capacitive sensor decreases, a trailing edge of an object may be identified when an absolute difference between the signal strength of the first capacitive sensor and the signal strength of the second capacitive sensor reaches a second maximum.

Figure 3D:
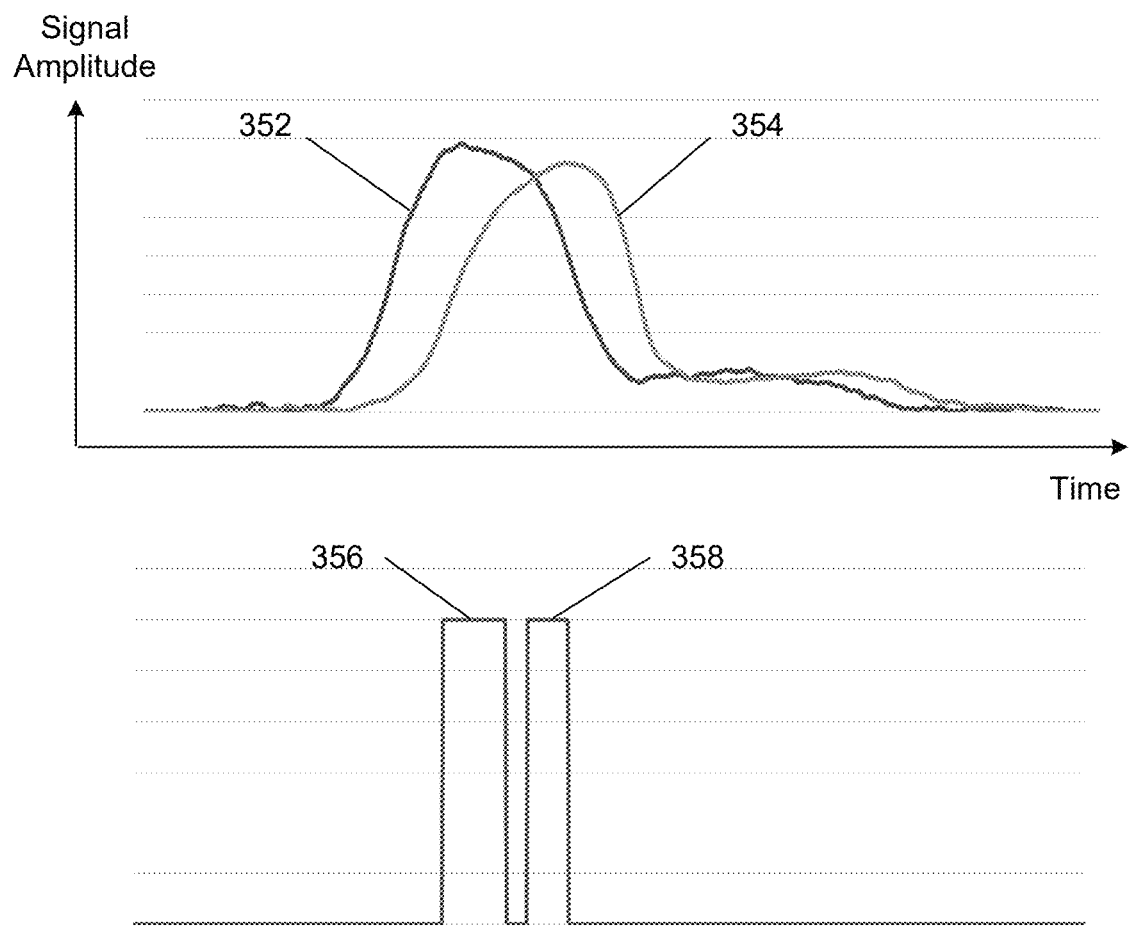
FIG. 3D illustrates an exemplary method of detecting information about inner areas of an object according to aspects of the present invention.

FIG. 3D illustrates an exemplary method of detecting information about inner areas of an object according to aspects of the present invention. In the exemplary embodiment of FIG. 3D, the scan direction is from left to right. The horizontal axis represents time, and the vertical axis represents signal amplitude. Curve 352 indicates the signal strength amplitude of the leading capacitive sensor plate. Curve 354 indicates the signal strength amplitude of the trailing capacitive sensor plate.

An inner region is detected when the condition of the scanner being over an object is met and the signal strength amplitude is not within an edge detection range nor within center detection range. Numeral 356 indicates a left inner region of an object, and numeral 358 indicates a right inner region of the object.

Figure 3E:
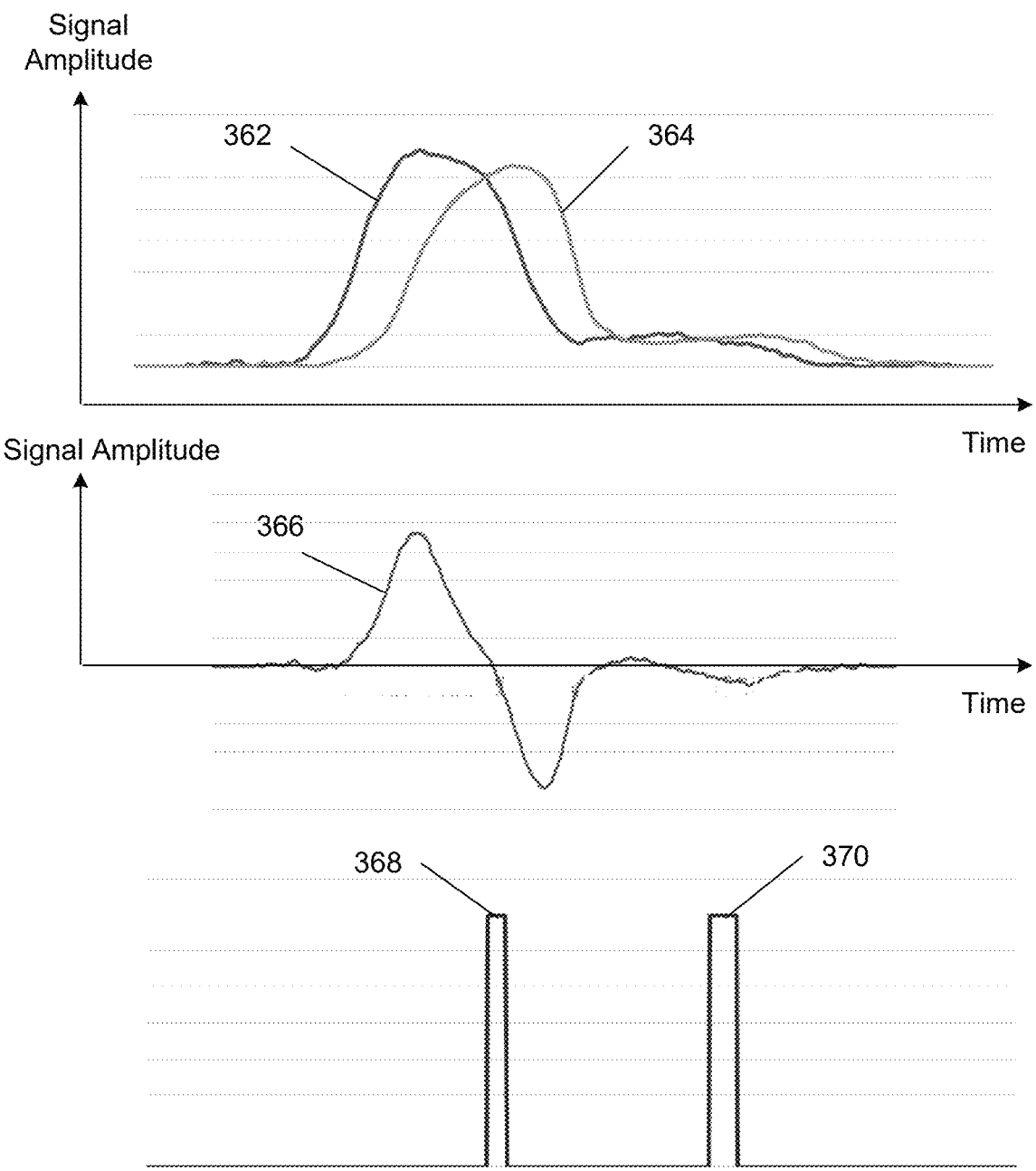
FIG. 3E illustrates an exemplary method of detecting information about the center of an object according to aspects of the present invention.

FIG. 3E illustrates an exemplary method of detecting information about the center of an object according to aspects of the present invention. In the example shown in FIG. 3E, the scan direction is from left to right. The horizontal axis represents time, and the vertical axis represents signal amplitude. Curve 362 indicates the signal strength amplitude of the leading capacitive sensor plate. Curve 364 indicates the signal strength amplitude of the trailing capacitive sensor plate.

In one embodiment, a center region is detected when the condition of the scanner being over an object is met and the difference in signal amplitude is within a predetermined maximum threshold and a predetermined minimum threshold for a center region. The predetermined maximum threshold and the predetermined minimum threshold for a center region may be determined by using empirical data through experimentation. Note that wood and metal studs can have different maximum and minimum threshold values for a center region. Weak signal range may have different maximum and minimum threshold values. Different signal strengths have different maximum and minimum strengths. Center region thresholds may change based on signal strength of capacitive plate amplitudes.

Curve 366 represents a difference in signal strength amplitude between the leading capacitive sensor plate and the trailing capacitive sensor plate. According to aspects of the present disclosure, a maximum threshold value (a positive value) and a minimum threshold value (a negative value) allows for fine-tuning while ensuring the center is indicated around the crossing of the two capacitive plates. The center region of objects behind an opaque surface may be determined when curve 366 crosses the horizontal axis coupled with the condition that the scanner being over an object is met. In the example of FIG. 3E, the center region of objects behind the opaque surface is shown at 368 and 370, respectively.

FIG. 4A illustrates an exemplary embodiment of detecting an ABS pipe behind an opaque surface according to aspects of the present invention. As shown in FIG. 4A, scanner 402 scans in a direction from left to right. The horizontal axis represents time, and the vertical axis represents signal amplitude. An ABS pipe 404 is an exemplary object behind an opaque surface (made visible for illustration purposes). Curve 408 represents an amplitude of signal strength detected by a leading capacitive sensor plate and curve 410 represents an amplitude of signal strength detected by a trailing capacitive sensor plate of the scanner 402. The sensor data collected by the capacitive sensors are processed and analyzed by a controller, such as controller 202 of FIG. 2. The analysis of sensor data collected is described in association with FIG. 3A-3E. Information derived from the analysis about objects behind the opaque surface can be communicated to a user through a display, such as display 210 of FIG. 2.

Figure 4B:
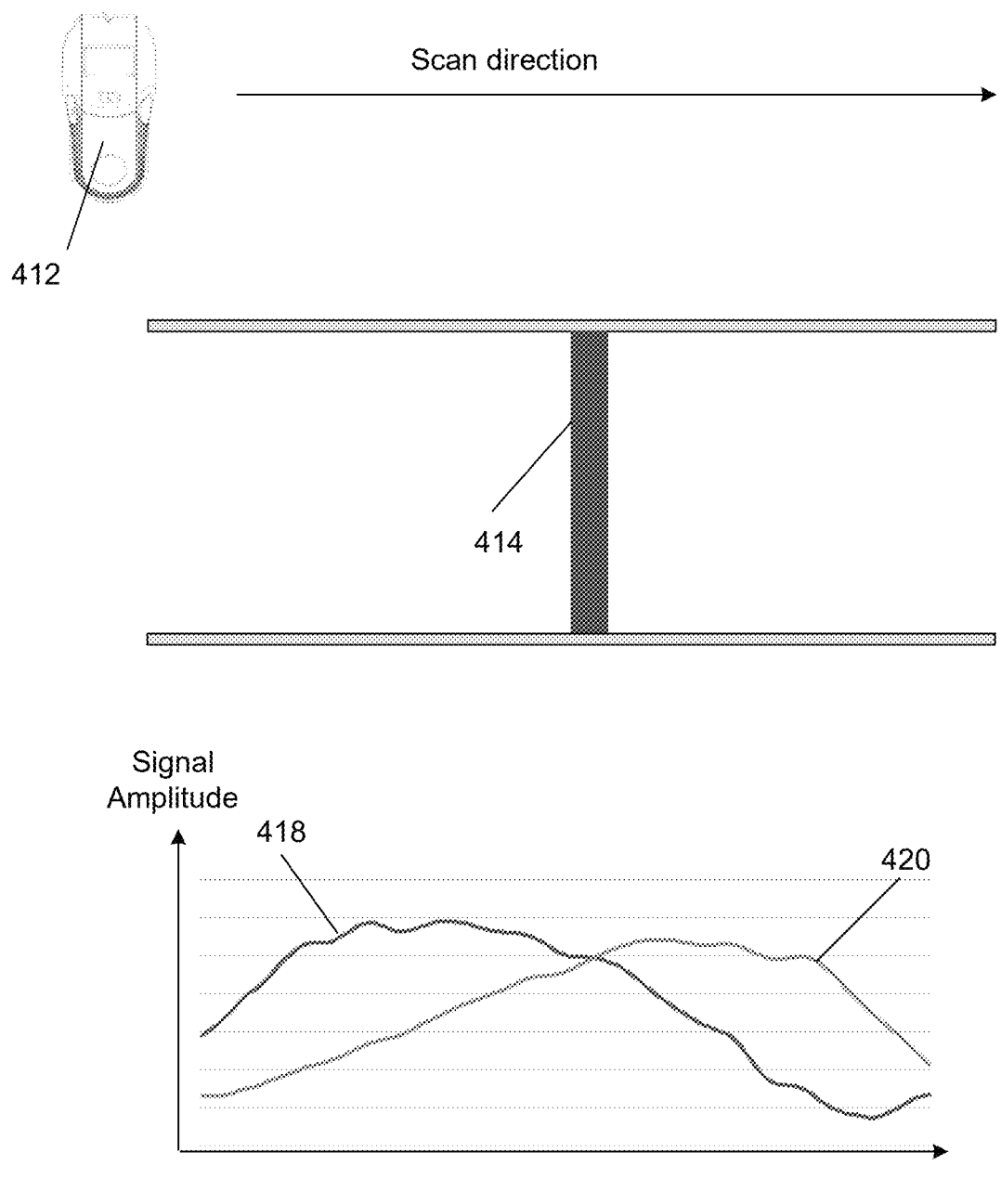
FIG. 4B illustrates an exemplary embodiment of detecting a cooper pipe behind an opaque surface according to aspects of the present invention.

FIG. 4B illustrates an exemplary embodiment of detecting a copper pipe behind an opaque surface according to aspects of the present invention. As shown in the exemplary embodiment of FIG. 4B, scanner 412 scans in a direction from left to right. The horizontal axis represents time, and the vertical axis represents signal amplitude. A copper pipe 414 is an exemplary object behind an opaque surface (made visible for illustration purposes). Curve 418 represents an amplitude of signal strength detected by a leading capacitive sensor plate and curve 420 represents an amplitude of signal strength detected by a trailing capacitive sensor plate of the scanner 412. The sensor data collected by the capacitive sensors are processed and analyzed by a controller, such as controller 202 of FIG. 2. The analysis of sensor data collected is described in association with FIG. 3A-3E. Information derived from the analysis about objects behind the opaque surface can be communicated to a user through a display, such as display 210 of FIG. 2.

Figure 4C:
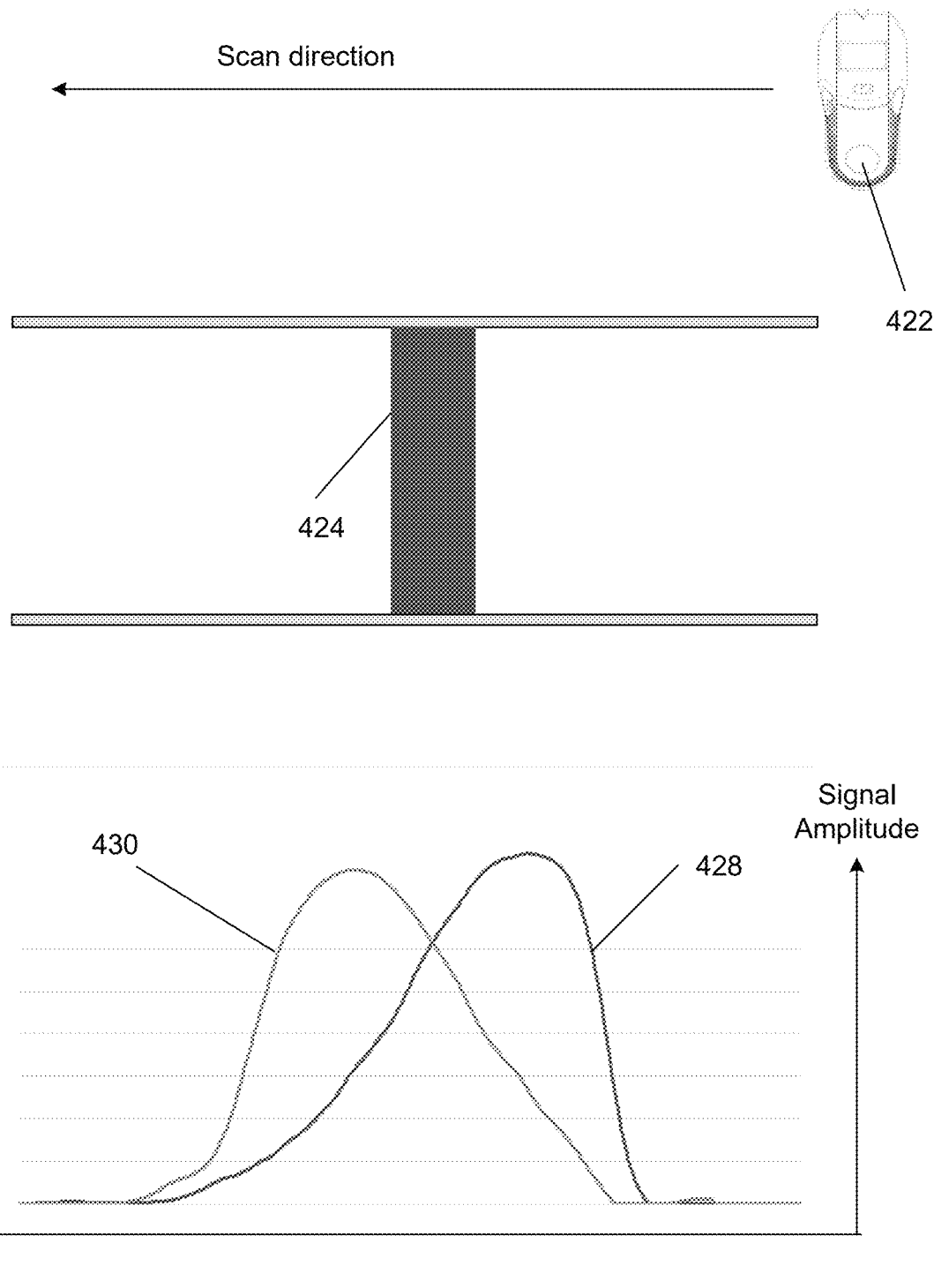
FIG. 4C illustrates an exemplary embodiment of detecting a metal stud behind an opaque surface according to aspects of the present invention.

FIG. 4C illustrates an exemplary embodiment of detecting a metal stud behind an opaque surface according to aspects of the present invention. In the example of FIG. 4C, scanner 422 scans in a direction from right to left. The horizontal axis represents time, and the vertical axis represents signal amplitude. A metal stud is an exemplary object behind an opaque surface (made visible for illustration purposes). Curve 428 represents an amplitude of signal strength detected by a leading capacitive sensor plate and curve 430 represents an amplitude of signal strength detected by a trailing capacitive sensor plate of the scanner 422. The sensor data collected by the capacitive sensors are processed and analyzed by a controller, such as controller 202 of FIG. 2. The analysis of sensor data collected is described in association with FIG. 3A-3E. Information derived from the analysis about objects behind the opaque surface can be communicated to a user through a display, such as display 210 of FIG. 2.

Figure 4D:
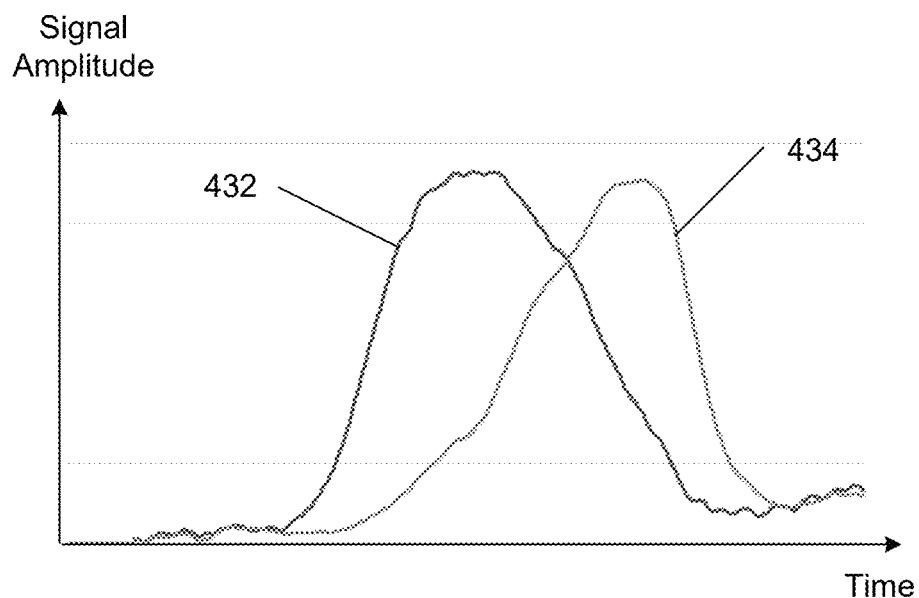
FIG. 4D illustrates an exemplary method of detecting information about an unbalanced wall according to aspects of the present invention.
Figure 4D:
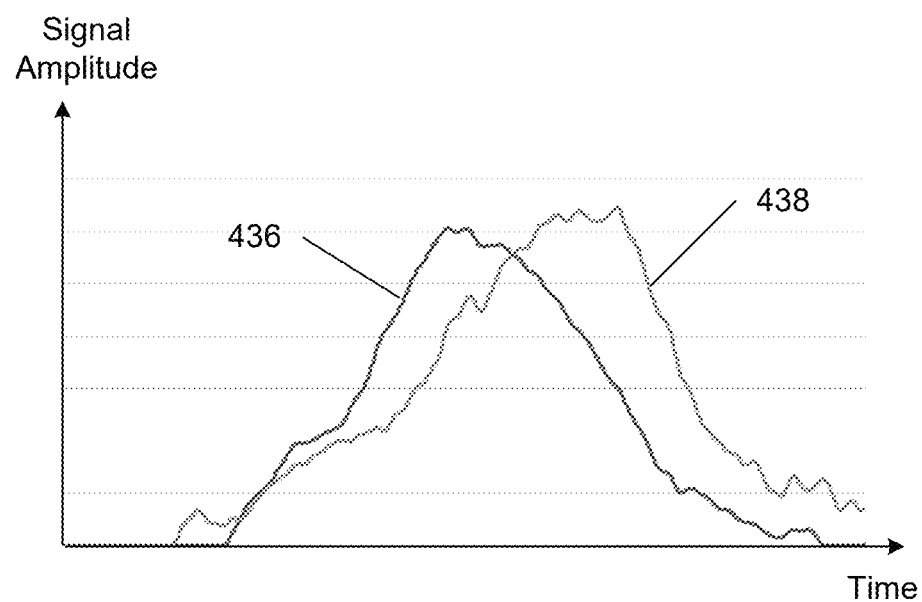

FIG. 4D illustrates an exemplary method of detecting information about an unbalanced wall according to aspects of the present invention. The horizontal axis represents time, and the vertical axis represents signal amplitude. Unbalanced walls may occur when the signal strength of one or both capacitive plates are not at the same signal strength amplitude on either side of an object. For example, in a situation of one exemplary unbalanced wall with a 0.5-inch drywall, Curve 432 indicates the signal strength amplitude of the leading capacitive sensor plate. Curve 434 indicates the signal strength amplitude of the trailing capacitive sensor plate. In a situation of another exemplary unbalanced wall with a 1.25-inches drywall, Curve 436 indicates the signal strength amplitude of the leading capacitive sensor plate. Curve 438 indicates the signal strength amplitude of the trailing capacitive sensor plate. By employing the methods described in FIG. 3A through FIG. 3E, better signal profiles of objects behind unbalanced walls may be created, and thus allow the scanner to better detect the objects behind such unbalanced walls.

According to aspects of the present disclosure, in situation of weak signal, the controller examines the signal strength amplitude of the leading capacitive sensor plate and the trailing capacitive sensor plate to determine whether the average signal strength amplitude of the leading capacitive sensor plate and the trailing capacitive sensor plate is within the maximum threshold and minimum threshold.

Note that the thresholds may vary depending on a gain sensitivity mode the scanner is currently operating in. For a high gain sensitivity mode, a maximum weak signal threshold value of 10000 and a minimum weak signal threshold value of 3000 may be used. For a low gain sensitivity mode, a maximum weak signal threshold value of 3200 and a minimum weak signal threshold value of 1600 may be used. When the scanner is within the weak signal range, the user interface may not display edges or inner regions to the user.

Figure 5A:
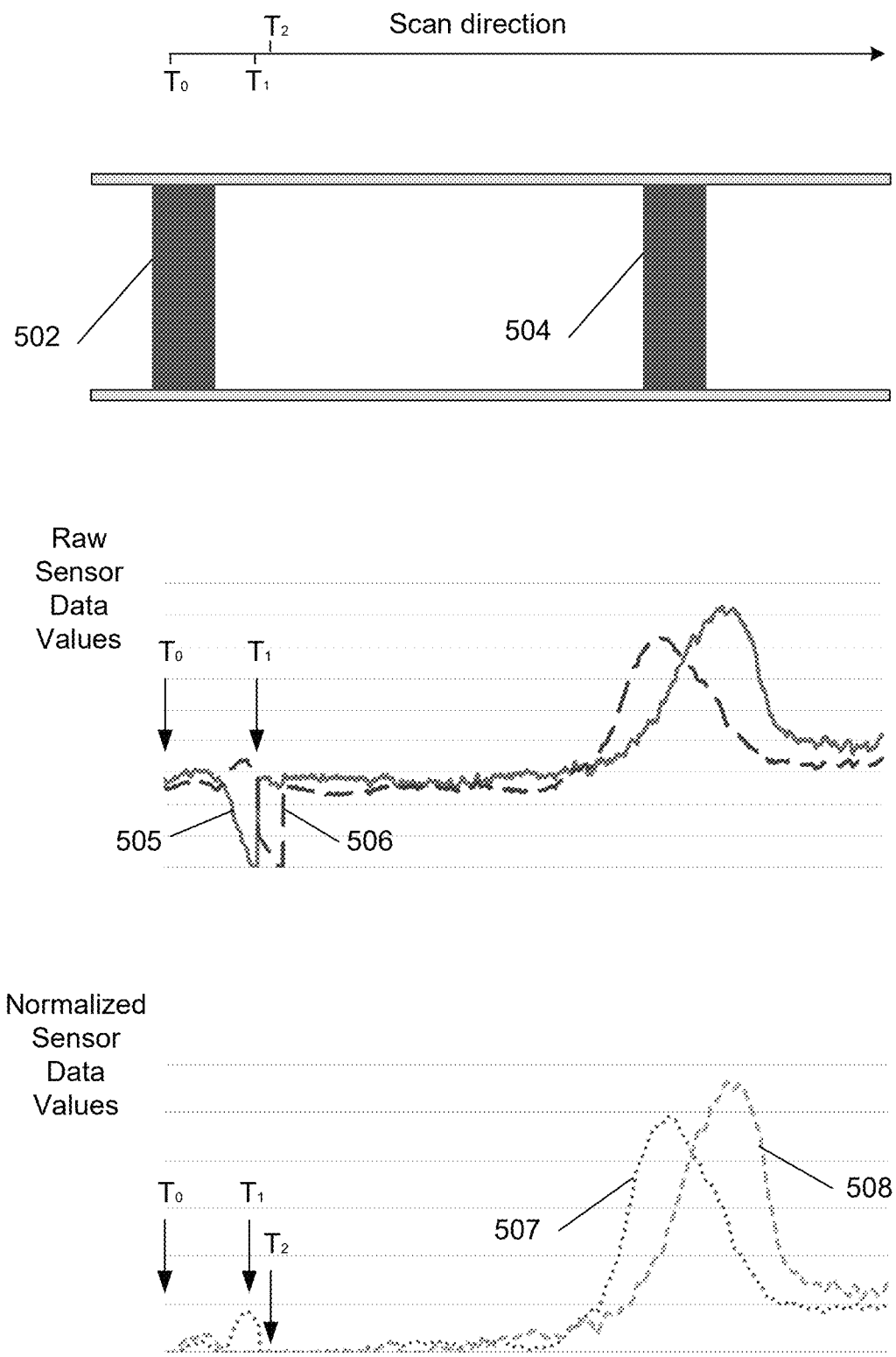
FIG. 5A illustrates an example of dynamic calibration according to aspects of the present invention.

FIG. 5A illustrates an example of dynamic calibration according to aspects of the present invention. In the example of FIG. 5A, at time $T_0$, the scanner has a starting location over a stud 502 behind an opaque surface, and the scan direction is from left to right. In this example, a power on calibration may take place over the stud 502, where gain sensitivity value for the pair of capacitive sensors, and a baseline minimum signal strength are set based on an initial set of raw sensor data collected.

Curve 505 represents raw sensor data values (a.k.a. raw signal strength) collected by a leading capacitive sensor plate, and curve 506 represents raw sensor data values collected by a trailing capacitive sensor plate. Curve 507 represents normalized sensor data values (a.k.a. normalized signal strength) derived from the raw sensor data values collected by the leading capacitive sensor plate, and Curve 508 represents normalized sensor data values derived from the raw sensor data values collected by the trailing capacitive sensor plate. The conversion of raw sensor data value to normalized sensor data value is based on the baseline minimum signal strength determined upon power on or based on an updated baseline minimum signal strength in the recalibration process.

As the scanner moves away from the stud 502, at time $T_1$, the current minimum signal strength detected by the pair of capacitive sensors of the scanner may drop below the baseline minimum signal strength, which can trigger a recalibration. In the process of recalibration, the baseline minimum signal strength is updated using the current minimum signal strength detected. The pair of capacitive sensors is recalibrated using the baseline minimum signal strength. For example, at time $T_2$, the normalized signal strength computed can have a minimum value set to zero. After recalibration, the scanner continues to scan for objects, such as stud 504, behind the opaque surface with an improved accuracy.

Note that the objects and time stamps are provided for illustration purposes. They are not drawn to scale. The process of calibration/recalibration can occur dynamically without user interference. The process of calibration/recalibration may occur a number of times if the current minimum signal strength detected by the pair of capacitive sensors of the scanner has dropped below the stored baseline minimum signal strength, which can trigger another recalibration. One benefit of the method of dynamic calibration/recalibration is that it allows the scanner to detect objects behind the opaque surface, such as stud 504, more accurately even if the scanner is initially calibrated on top of an unintended object, such as stud 502, behind the opaque surface.

Figure 5B:
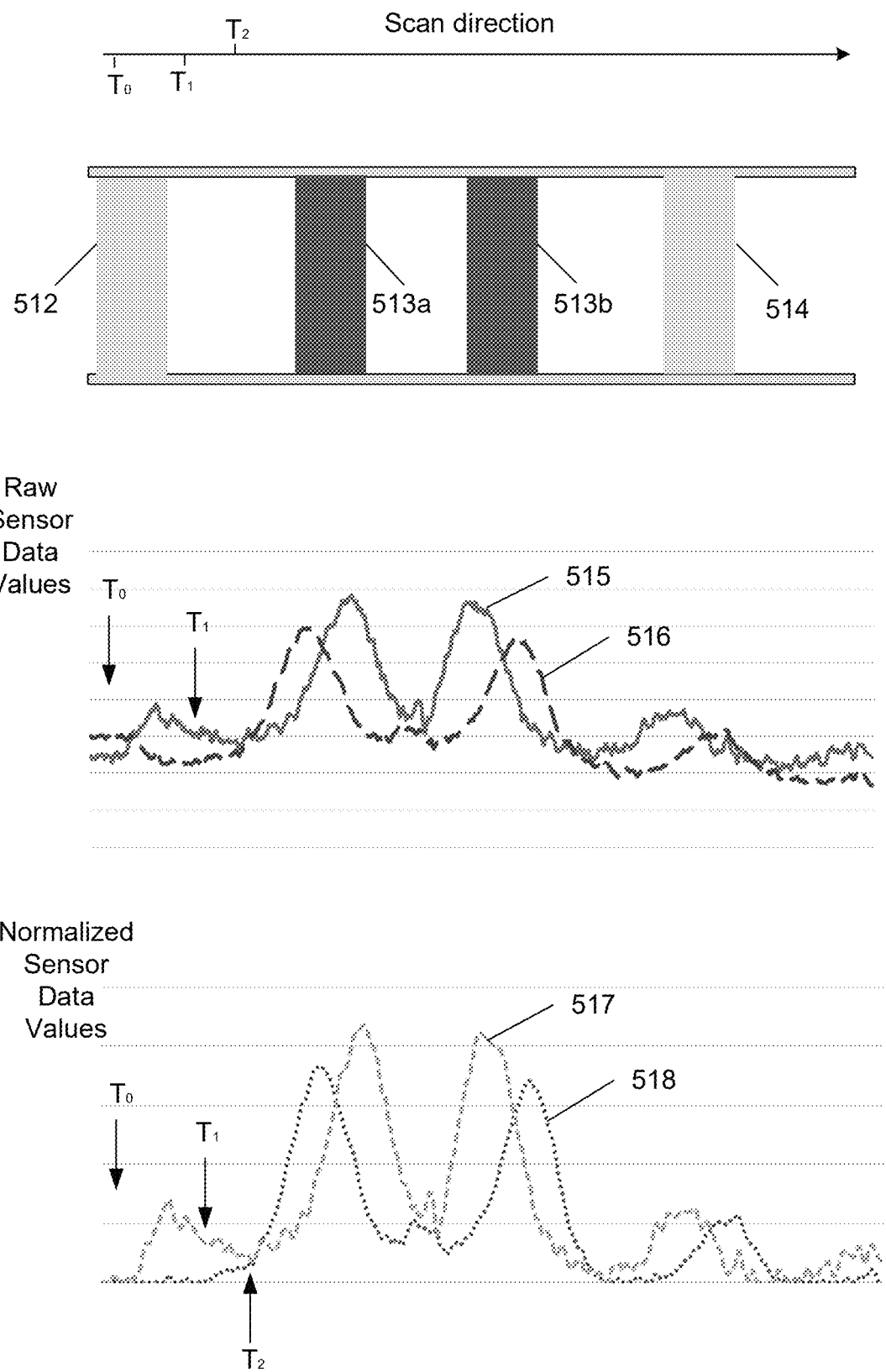
FIG. 5B illustrates another example of dynamic calibration according to aspects of the present invention.

FIG. 5B illustrates another example of dynamic calibration according to aspects of the present invention. As shown in FIG. 5B, at time $T_0$, the scanner has a starting location over a PVC pipe 512 behind an opaque surface, and the scan direction is from left to right. A power on calibration may take place over the PVC pipe 512, where gain sensitivity value for the pair of capacitive sensors, and a baseline minimum signal strength are set based on an initial set of raw sensor data collected.

Curve 515 represents raw sensor data values (a.k.a. raw signal strength) collected by a leading capacitive sensor plate, and curve 516 represents raw sensor data values collected by a trailing capacitive sensor plate. Curve 517 represents normalized sensor data values (a.k.a. normalized signal strength) derived from the raw sensor data values collected by the leading capacitive sensor plate, and Curve 518 represents normalized sensor data values derived from the raw sensor data values collected by the trailing capacitive sensor plate. The conversion of raw sensor data value to normalized sensor data value is based on the baseline minimum signal strength determined upon power on or based on an updated baseline minimum signal strength in the recalibration process.

As the scanner moves away from the PVC pipe 512, at time $T_1$, the current minimum signal strength detected by the pair of capacitive sensors of the scanner may drop below the baseline minimum signal strength, which can trigger a recalibration. In the process of recalibration, the baseline minimum signal strength is updated using the current minimum signal strength detected. The pair of capacitive sensors is recalibrated using the baseline minimum signal strength. After recalibration (e.g. after $T_2$), the scanner continues to scan for objects, such as studs 513a, 513b and PVC pipe 514, behind the opaque surface with an improved accuracy.

Note that the objects and time stamps are provided for illustration purposes. They are not drawn to scale. The process of calibration/recalibration can occur dynamically without user interference. The process of calibration/recalibration may occur a number of times if the current minimum signal strength detected by the pair of capacitive sensors of the scanner has dropped below the stored baseline minimum signal strength, which can trigger another recalibration. One benefit of the method of dynamic calibration/recalibration is that it allows the scanner to detect objects behind the opaque surface, such as such as studs 513a, 513b and PVC pipe 514 in the example FIG. 5B, more accurately even if the scanner is initially calibrated on top of an unintended object, such as PVC pipe 512, behind the opaque surface.

Figure 5C:
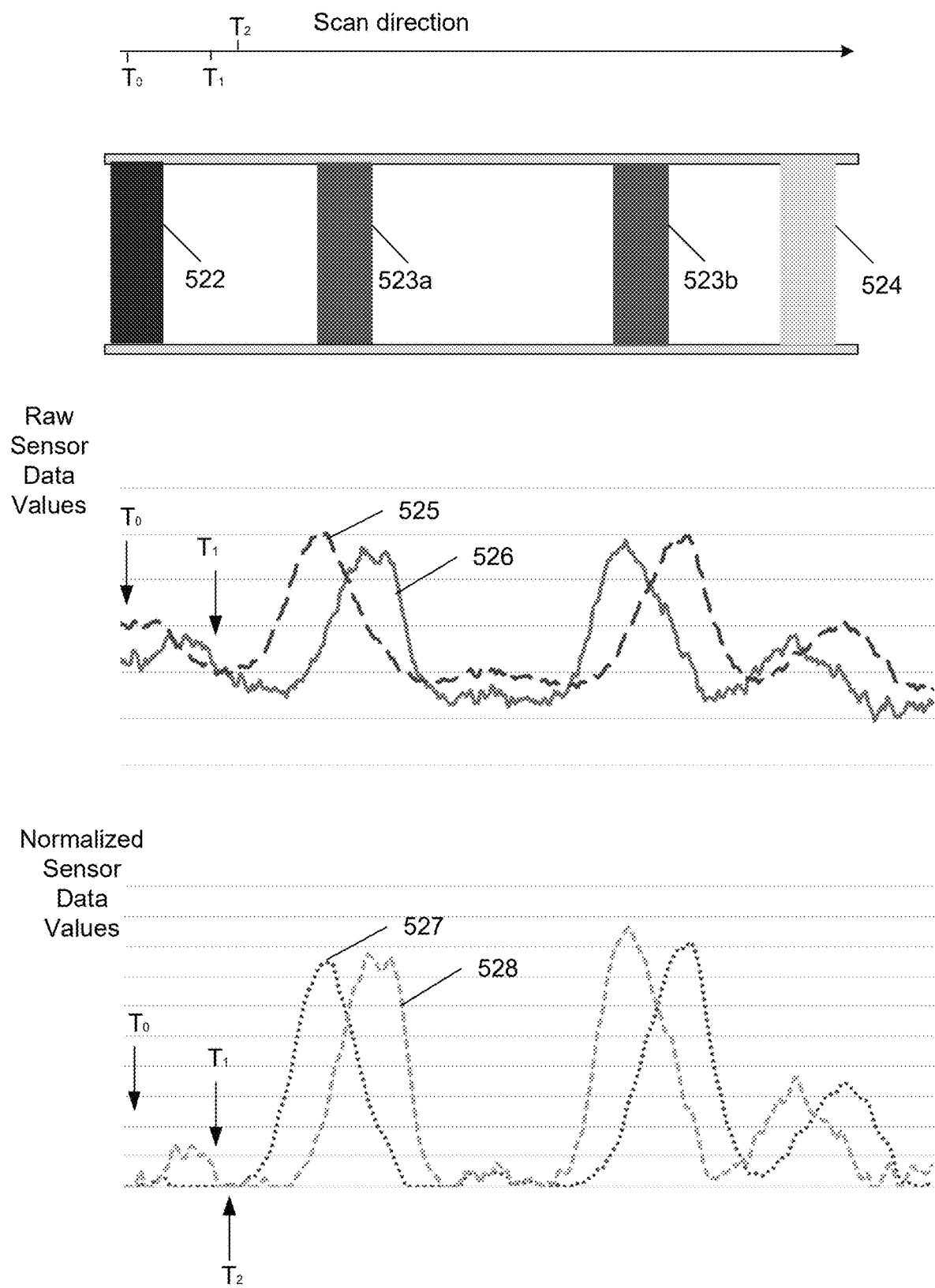
FIG. 5C illustrates yet another example of dynamic calibration according to aspects of the present invention.

FIG. 5C illustrates yet another example of dynamic calibration according to aspects of the present invention. As shown in the exemplary embodiment of FIG. 5C, at time $T_0$, the scanner has a starting location over a copper pipe 522 behind an opaque surface, and the scan direction is from left to right. A power on calibration may take place over the copper pipe 522, where gain sensitivity value for the pair of capacitive sensors, and a baseline minimum signal strength are set based on an initial set of raw sensor data collected.

Curve 525 represents raw sensor data values (a.k.a. raw signal strength) collected by a leading capacitive sensor plate, and curve 526 represents raw sensor data values collected by a trailing capacitive sensor plate. Curve 527 represents normalized sensor data values (a.k.a. normalized signal strength) derived from the raw sensor data values collected by the leading capacitive sensor plate, and Curve 528 represents normalized sensor data values derived from the raw sensor data values collected by the trailing capacitive sensor plate. The conversion of raw sensor data value to normalized sensor data value is based on the baseline minimum signal strength determined upon power on or based on an updated baseline minimum signal strength in the recalibration process.

As the scanner moves away from the copper pipe 522, at time $T_1$, the current minimum signal strength detected by the pair of capacitive sensors of the scanner may drop below the baseline minimum signal strength, which can trigger a recalibration. In the process of recalibration, the baseline minimum signal strength is updated using the current minimum signal strength detected. The pair of capacitive sensors is recalibrated using the baseline minimum signal strength. After recalibration (e.g. after $T_2$), the scanner continues to scan for objects, such as studs 523a, 523b and PVC pipe 524, behind the opaque surface with an improved accuracy.

Note that the objects and time stamps are provided for illustration purposes. They are not drawn to scale. The process of calibration/recalibration can occur dynamically without user interference. The process of calibration/recalibration may occur a number of times if the current minimum signal strength detected by the pair of capacitive sensors of the scanner has dropped below the stored baseline minimum signal strength, which can trigger another recalibration. One benefit of the method of dynamic calibration/recalibration is that it allows the scanner to detect objects behind the opaque surface, such as such as studs 523*a*, 523*b* and PVC pipe 524 in the example FIG. 5B, more accurately even if the scanner is initially calibrated on top of an unintended object, such as copper pipe 522, behind the opaque surface.

Figure 6A:
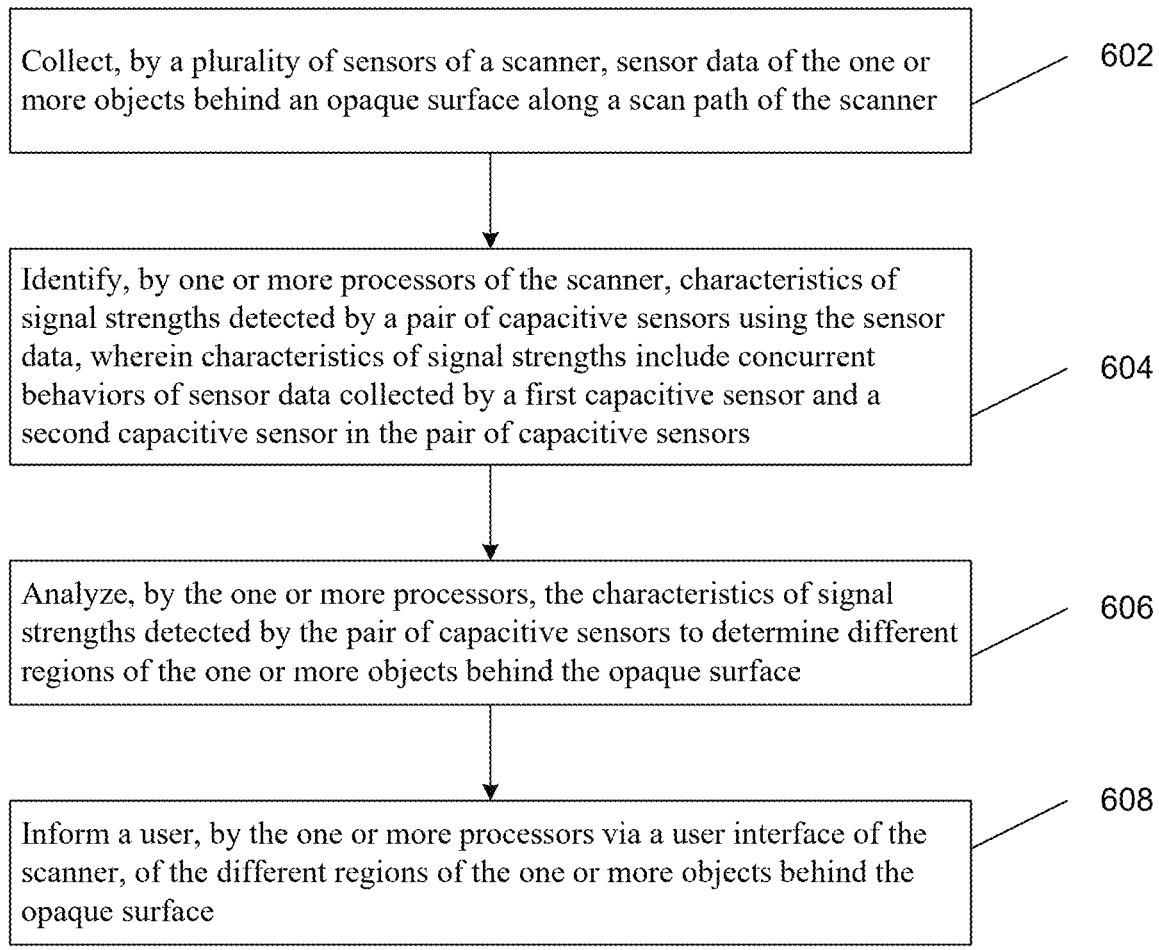
FIG. 6A illustrates an exemplary method of detecting objects behind an opaque surface according to aspects of the present invention.

FIG. 6A illustrates a method of detecting objects behind an opaque surface according to aspects of the present invention. As shown in FIG. 6A, in block 602, the method collects, by a plurality of sensors of a scanner, sensor data of the one or more objects behind an opaque surface along a scan path of the scanner. In block 604, the method identifies, by one or more processors of the scanner, characteristics of signal strengths detected by a pair of capacitive sensors using the sensor data, wherein characteristics of signal strengths include concurrent behaviors of sensor data collected by a first capacitive sensor and a second capacitive sensor in the pair of capacitive sensors. In block 606, the method analyzes, by the one or more processors, the characteristics of signal strengths detected by the pair of capacitive sensors to determine different regions of the one or more objects behind the opaque surface. In block 608, the method informs a user, by the one or more processors via a user interface of the scanner, of the different regions of the one or more objects behind the opaque surface.

Figure 6B:
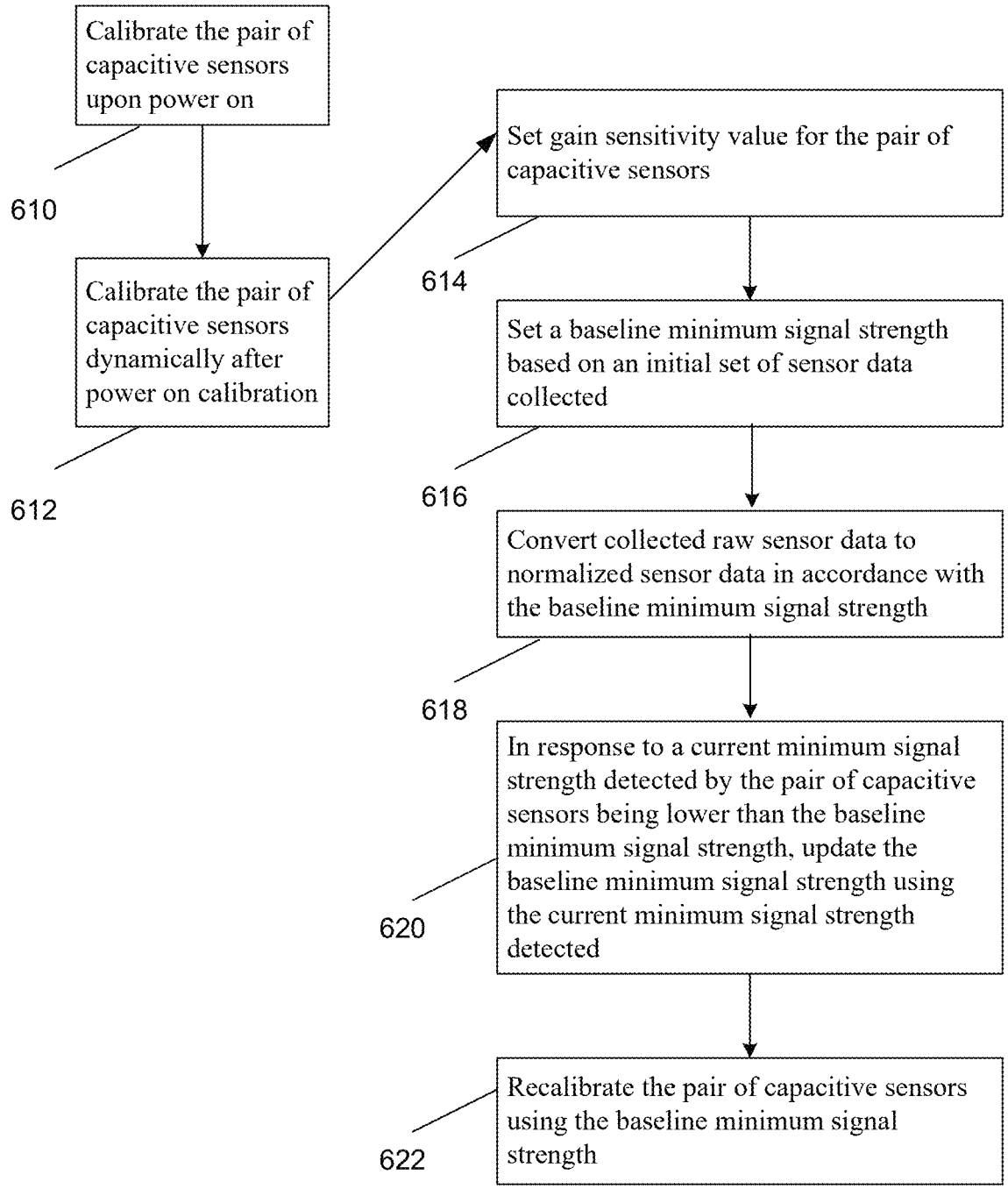
FIG. 6B illustrates an exemplary method of calibrating capacitive sensors according to aspects of the present invention.

FIG. 6B illustrates an exemplary method of calibrating capacitive sensors according to aspects of the present invention. As shown in FIG. 6B, in block 610, the method calibrates the pair of capacitive sensors upon power on of the scanner. In block 612, the method calibrates the pair of capacitive sensors dynamically after power on calibration.

According to aspects of the present disclosure, the methods performed in block 610 and block 612 may further include the methods performed in blocks 614 through 622. In block 614, the method sets gain sensitivity value for the pair of capacitive sensors. In block 616, the method sets a baseline minimum signal strength based on an initial set of sensor data collected. In block 618, the method converts collected raw sensor data to normalized sensor data in accordance with the baseline minimum signal strength.

According to aspects of the present disclosure, the methods performed in block 614 and block 616 may further include the methods performed in block 620 and block 622. In block 620, in response to a current minimum signal strength detected by the pair of capacitive sensors being lower than the baseline minimum signal strength, the method updates the baseline minimum signal strength using the current minimum signal strength detected. In block 622, the method recalibrates the pair of capacitive sensors using the baseline minimum signal strength.

FIG. 6C illustrates an exemplary method of identifying regions of an object according to aspects of the present invention. In the example of FIG. 6C, in block 624, in response to the signal strength of the first capacitive sensor increases and the signal strength of the second capacitive sensor increases, the method identifies a leading edge of an object based on an absolute difference between the signal strength of the first capacitive sensor and the signal strength of the second capacitive sensor reaches a first maximum.

In block 626, in response to the signal strength of the first capacitive sensor decreases and the signal strength of the second capacitive sensor decreases, the method identifies a trailing edge of an object based on an absolute difference between the signal strength of the first capacitive sensor and the signal strength of the second capacitive sensor reaches a second maximum.

In block 628, in response to a leading edge being detected, the method identifies a center of an object based on a difference between the signal strength of the first capacitive sensor and the signal strength of the second capacitive sensor reaches a minimum.

Figure 6D:
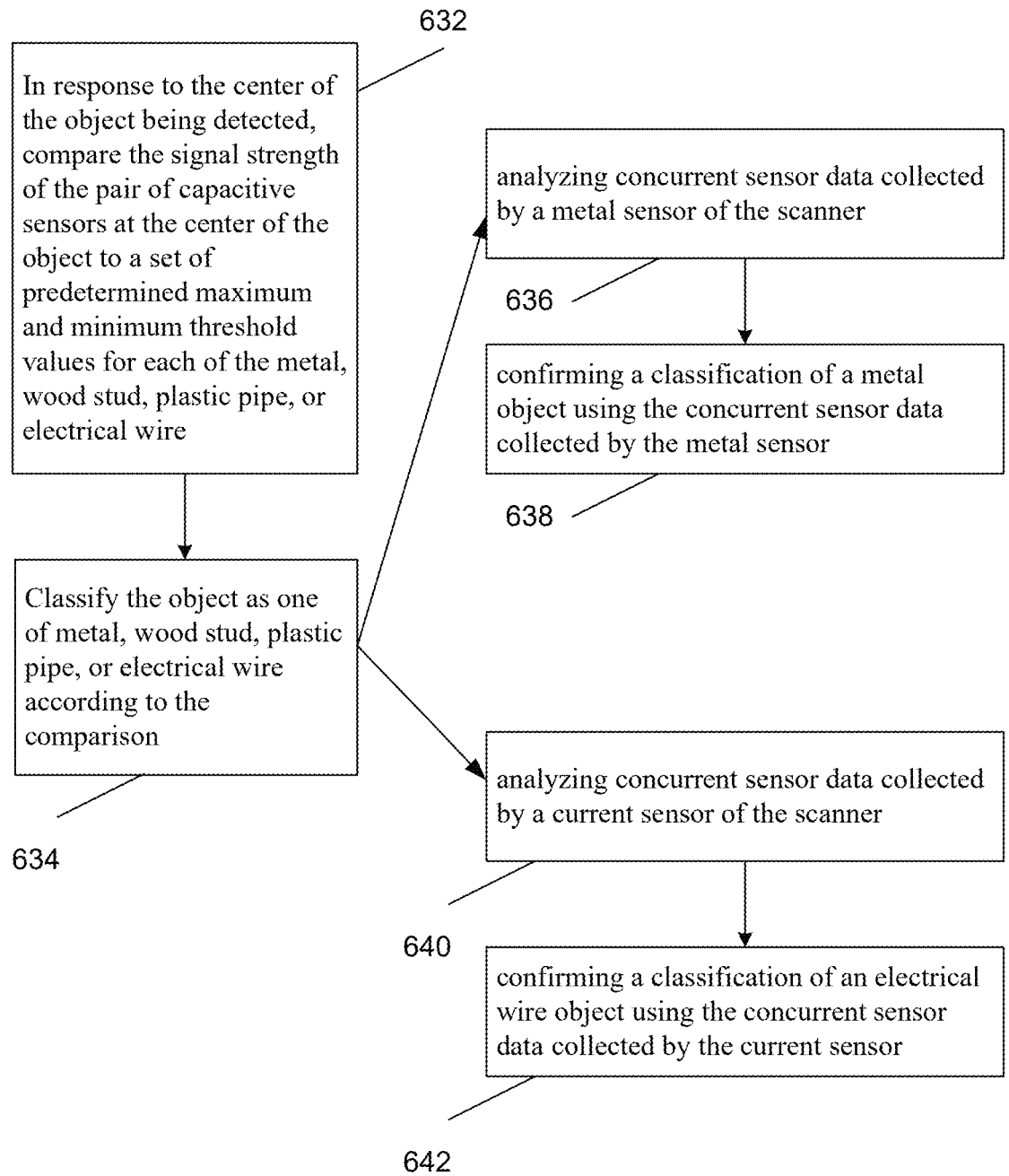
FIG. 6D illustrates an exemplary method of classifying objects behind an opaque surface according to aspects of the present invention.

FIG. 6D illustrates an exemplary method of classifying objects behind an opaque surface according to aspects of the present invention. In the exemplary implementation of FIG. 6D, in block 632, in response to the center of the object being detected, the method compares the signal strength of the pair of capacitive sensors at the center of the object to a set of predetermined maximum and minimum threshold values for each of the metal, wood stud, plastic pipe, or electrical wire. The set of predetermined maximum and minimum threshold values for each of the metal, wood stud, plastic pipe, or electrical wire may be determined by using empirical data through experimentation. In block 634, the method classifies the object as one of metal, wood stud, plastic pipe, or electrical wire according to the comparison.

According to aspects of the present disclosure, the methods performed in blocks 632 and 634 may further include the methods performed in blocks 636 through 642. In block 636, the method analyzes concurrent sensor data collected by a metal sensor of the scanner. In block 638, the method confirms a classification of a metal object using the concurrent sensor data collected by the metal sensor. In block 640, the method analyzes concurrent sensor data collected by a current sensor of the scanner. In block 642, the method confirms a classification of an electrical wire object using the concurrent sensor data collected by the current sensor.

The benefits of the methods described above in detecting and classifying objects behind an opaque surface can avoid falsely reporting electrical wires, plastic water pipes or metal water pipes as studs. Besides the risk of damaging the electrical wires and water pipes, which in turn can help users to avoid injuries from hazards of drilling into electrical wires or to avoid damage of drilling into plastic water pipes.

It will be appreciated that the above descriptions for clarity have described embodiments of the invention with reference to different functional units and controllers. However, it will be apparent that any suitable distribution of functionality between different functional units or processors or controllers may be used without detracting from the invention. For example, functionality illustrated to be performed by separate processor(s) or controller(s) may be performed by the same processor(s) and/or controller(s) included with the unit. In another exemplary embodiment, functionality illustrated to be performed by the processor and/or controller or the display may be performed by an independent and/or remote receiving device that may be able to display the information and/or provide a means accessible to the user. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors, along with the hardware components described above. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors/controllers.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A scanner for detecting one or more objects detected behind an opaque surface, comprising:
    a plurality of sensors of the scanner configured to collect sensor data of the one or more objects behind the opaque surface along a scan path of the scanner;
    one or more processors of the scanner configured to identify characteristics of signal strengths detected by a pair of capacitive sensors using the sensor data, wherein characteristics of signal strengths include concurrent behaviors of sensor data collected by a first capacitive sensor and a second capacitive sensor in the pair of capacitive sensors;
    the one or more processors are further configured to analyze the characteristics of signal strengths detected by the pair of capacitive sensors to determine different regions of the one or more objects behind the opaque surface; and
    the one or more processors via a user interface of the scanner are further configured to inform a user of the different regions of the one or more objects behind the opaque surface.

2. The scanner of claim 1, wherein the one or more processors are further configured to:
    calibrate the pair of capacitive sensors upon power on; and
    calibrate the pair of capacitive sensors dynamically after power on calibration.

3. The scanner of claim 2, wherein the one or more processors are further configured to:
    set gain sensitivity value for the pair of capacitive sensors;
    set a baseline minimum signal strength based on an initial set of sensor data collected; and
    convert collected raw sensor data to normalized sensor data in accordance with the baseline minimum signal strength.

4. The scanner of claim 3, wherein the one or more processors are further configured to:
    in response to a current minimum signal strength detected by the pair of capacitive sensors being lower than the baseline minimum signal strength,
    update the baseline minimum signal strength using the current minimum signal strength detected; and
    recalibrate the pair of capacitive sensors using the baseline minimum signal strength.

5. The scanner of claim 1, wherein the one or more processors are further configured to:
    in responses to the signal strength of the first capacitive sensor increases and the signal strength of the second capacitive sensor increases,
    identify a leading edge of an object based on an absolute difference between the signal strength of the first capacitive sensor and the signal strength of the second capacitive sensor reaches a first maximum.

6. The scanner of claim 1, wherein the one or more processors are further configured to:
    in response to the signal strength of the first capacitive sensor decreases and the signal strength of the second capacitive sensor decreases,
    identify a trailing edge of an object based on based on an absolute difference between the signal strength of the first capacitive sensor and the signal strength of the second capacitive sensor reaches a second maximum.

7. The scanner of claim 1, wherein the one or more processors are further configured to:
    in response to a leading edge being detected,
    identify a center of an object based on a difference between the signal strength of the first capacitive sensor and the signal strength of the second capacitive sensor reaches a minimum.

8. The scanner of claim 7, wherein the one or more processors are further configured to:
    in response to the center of the object being detected,
    compare the signal strength of the pair of capacitive sensors at the center of the object to a set of predetermined maximum and minimum threshold values for each of the metal, wood stud, plastic pipe, or electrical wire; and
    classify the object as one of metal, wood stud, plastic pipe, or electrical wire according to the comparison.

9. The scanner of claim 8, wherein the one or more processors are further configured to:
    analyze concurrent sensor data collected by a metal sensor of the scanner; and
    confirm a classification of a metal object using the concurrent sensor data collected by the metal sensor.

10. The scanner of claim 8, wherein the one or more processors are further configured to:
    analyzing concurrent sensor data collected by a current sensor of the scanner; and
    confirming a classification of an electrical wire object using the concurrent sensor data collected by the current sensor.

11. A method for detecting one or more objects detected behind an opaque surface, comprising:
    collecting, by a plurality of sensors of a scanner, sensor data of the one or more objects behind an opaque surface along a scan path of the scanner;
    identifying, by one or more processors of the scanner, characteristics of signal strengths detected by a pair of capacitive sensors using the sensor data, wherein characteristics of signal strengths include concurrent behaviors of a first capacitive sensor and a second capacitive sensor in the pair of capacitive sensors;
    analyzing, by the one or more processors, the characteristics of signal strengths detected by the pair of capacitive sensors to determine different regions of the one or more objects behind the opaque surface; and
    informing a user, by the one or more processors via a user interface of the scanner, of the different regions of the one or more objects behind the opaque surface.

12. The method of claim 11, further comprising:
    calibrating the pair of capacitive sensors upon power on; and calibrating the pair of capacitive sensors dynamically after power on calibration.

13. The method of claim 12, wherein calibrating the pair of capacitive sensors upon power on comprises:
setting gain sensitivity value for the pair of capacitive sensors;
setting a baseline minimum signal strength based on an initial set of sensor data collected; and
converting collected raw sensor data to normalized sensor data in accordance with the baseline minimum signal strength.

14. The method of claim 13, wherein calibrating the pair of capacitive sensors dynamically comprises:
in response to a current minimum signal strength detected by the pair of capacitive sensors being lower than the baseline minimum signal strength,
updating the baseline minimum signal strength using the current minimum signal strength detected; and
recalibrating the pair of capacitive sensors using the baseline minimum signal strength.

15. The method of claim 11, wherein analyzing the characteristics of signal strengths detected by the pair of capacitive sensors further comprises:
in responses to the signal strength of the first capacitive sensor increases and the signal strength of the second capacitive sensor increases,
identifying a leading edge of an object based on an absolute difference between the signal strength of the first capacitive sensor and the signal strength of the second capacitive sensor reaches a first maximum.

16. The method of claim 11, wherein analyzing the characteristics of signal strengths detected by the pair of capacitive sensors further comprises:
in response to the signal strength of the first capacitive sensor decreases and the signal strength of the second capacitive sensor decreases,
identifying a trailing edge of an object based on based on an absolute difference between the signal strength of the first capacitive sensor and the signal strength of the second capacitive sensor reaches a second maximum.

17. The method of claim 11, wherein analyzing the characteristics of signal strengths detected by the pair of capacitive sensors further comprises:
in response to a leading edge being detected,
identifying a center of an object based on a difference between the signal strength of the first capacitive sensor and the signal strength of the second capacitive sensor reaches a minimum.

18. The method of claim 17, wherein analyzing the characteristics of signal strengths detected by the pair of capacitive sensors further comprises:
in response to the center of the object being detected,
comparing the signal strength of the pair of capacitive sensors at the center of the object to a set of predetermined maximum and minimum threshold values for each of the metal, wood stud, plastic pipe, or electrical wire; and
classifying the object as one of metal, wood stud, plastic pipe, or electrical wire according to the comparison.

19. The method of claim 18, wherein analyzing the characteristics of signal strengths detected by the pair of capacitive sensors further comprises:
analyzing concurrent sensor data collected by a metal sensor of the scanner; and
confirming a classification of a metal object using the concurrent sensor data collected by the metal sensor.

20. The method of claim 18, wherein analyzing the characteristics of signal strengths detected by the pair of capacitive sensors further comprises:
analyzing concurrent sensor data collected by a current sensor of the scanner; and
confirming a classification of an electrical wire object using the concurrent sensor data collected by the current sensor.

* * * * *